US007206737B2

(12) United States Patent
Seto

(10) Patent No.: US 7,206,737 B2
(45) Date of Patent: Apr. 17, 2007

(54) PEN TIP LANGUAGE AND LANGUAGE PALETTE

(75) Inventor: Tetsuo Seto, Bellevue, WA (US)

(73) Assignee: Mircosoft Corporation, Redmond, WA (US)

( * ) Notice: Subject to any disclaimer, the term of this patent is extended or adjusted under 35 U.S.C. 154(b) by 937 days.

(21) Appl. No.: 10/336,003

(22) Filed: Jan. 3, 2003

(65) Prior Publication Data

US 2004/0131252 A1 Jul. 8, 2004

(51) Int. Cl.
*G06G 17/20* (2006.01)
*C09K 19/02* (2006.01)
*G08C 17/00* (2006.01)

(52) U.S. Cl. ........................ 704/8; 345/179; 178/19.02

(58) Field of Classification Search ............ 178/18.01, 178/19.01, 19.02

See application file for complete search history.

(56) References Cited

U.S. PATENT DOCUMENTS 5,034,989 A * 7/1991 Loh ........................... 382/189
6,014,616 A * 1/2000 Kim .............................. 704/8
6,275,611 B1 * 8/2001 Parthasarathy .............. 382/187
6,289,303 B1 * 9/2001 Atkin et al. .................... 704/8
6,370,269 B1 * 4/2002 Al-Karmi et al. ........... 382/197
6,567,549 B1 * 5/2003 Marianetti et al. .......... 382/189
6,806,869 B2 10/2004 Yamakado
6,894,683 B2 * 5/2005 Clapper et al. ............. 345/179

FOREIGN PATENT DOCUMENTS

CN 1288183 A 3/2001
CN 1374596 A 10/2002

OTHER PUBLICATIONS

Lee, J. Kim, J. Nakajima, M. A hierarchical HMM network-based approach for on-line recognition of multi-lingual cursive handwritings, IEICE Trans. INF. & SYST. vol. E81-D, Jan. 1998.*

* cited by examiner

*Primary Examiner*—David Hudspeth
*Assistant Examiner*—Matthew J. Sked
(74) *Attorney, Agent, or Firm*—Banner & Witcoff, Ltd.

(57) ABSTRACT

A method and apparatus for receiving strokes of electronic ink in more than one language is provided. An input device is used to enter at least one stroke of electronic ink into a processing device. The processing device stores a language indication associated with the electronic ink, such that the language indication provides a way to associate a handwriting recognizer with the ink. The user may change the language or recognizer associated with the ink by flipping over a pen and using another tip of the pen or may use another pen or other input device. Aspects of the described system and method accommodate various optional interfaces to associate a pen tip or click of a button to one or more languages. Other aspects of the system and method include language switching of a displayed software keyboard when a pen input device is within a predetermined distance from a display.

76 Claims, 8 Drawing Sheets

Figure 4A
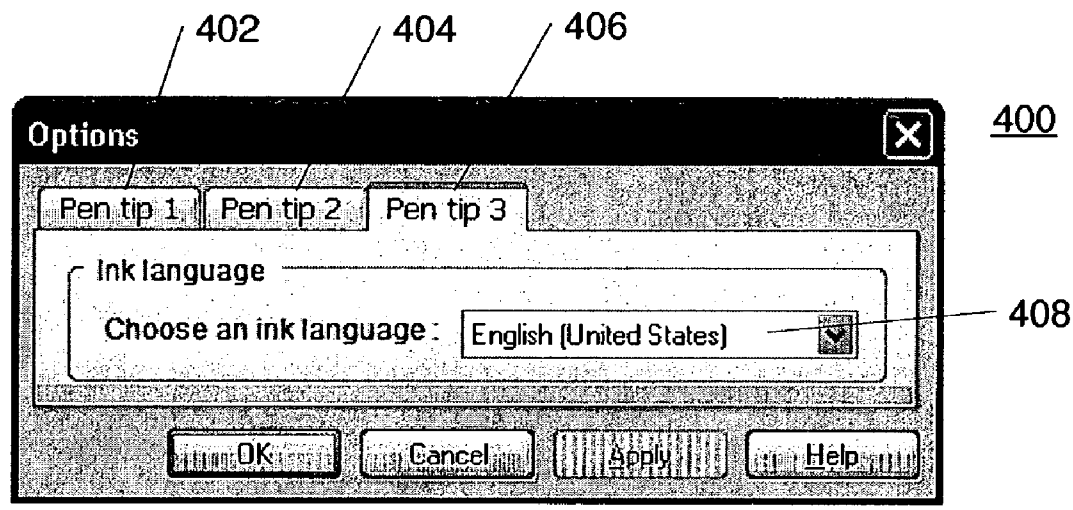
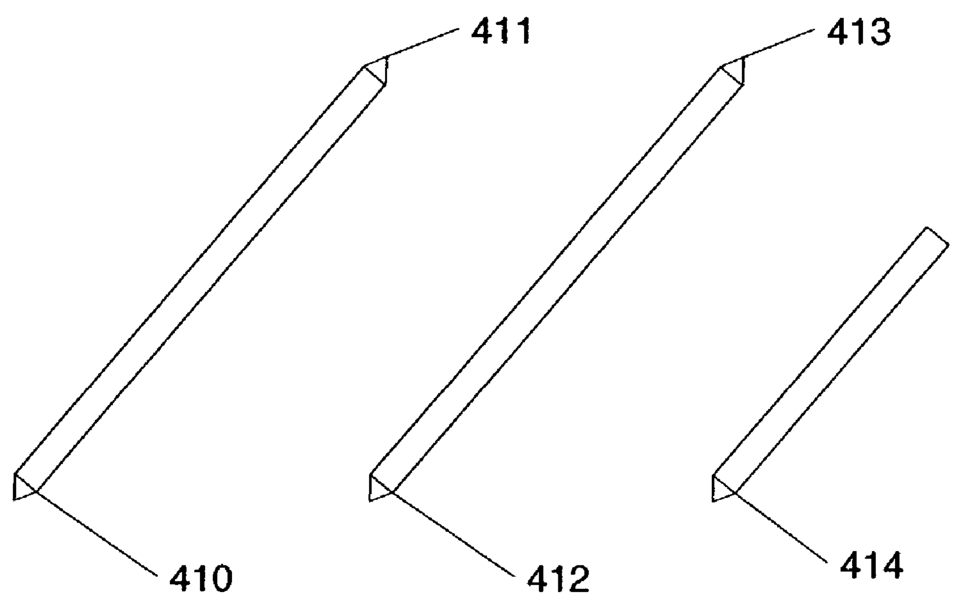
Figure 4B

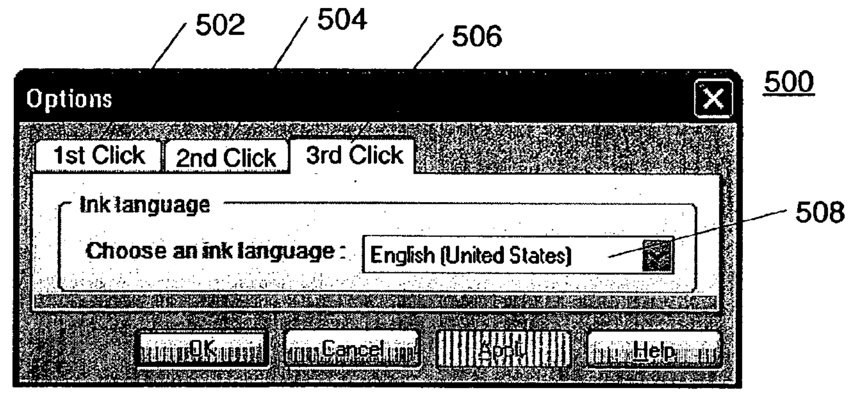
Figure 5A
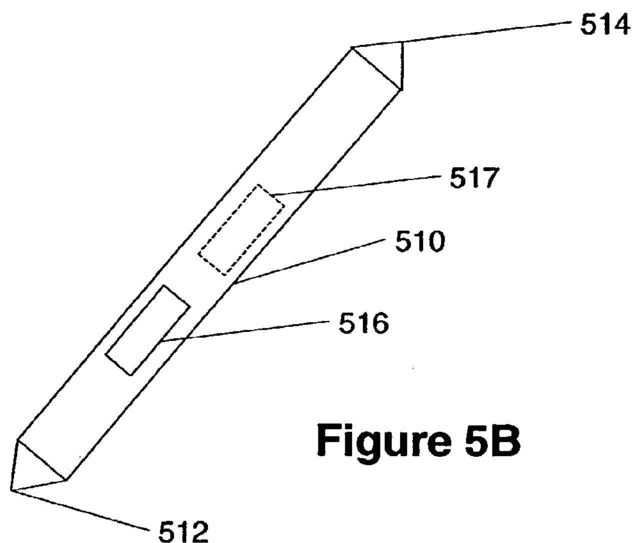
Figure 5B
Figure 5C
518
| | First Pen ID | Second Pen ID | ... |
|---|---|---|---|
| First Click | English | Japanese | |
| Second Click | French | English | |
| Third Click | German | Italian | |
| ... | | | |
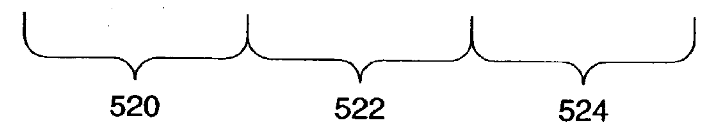

Figure 10A
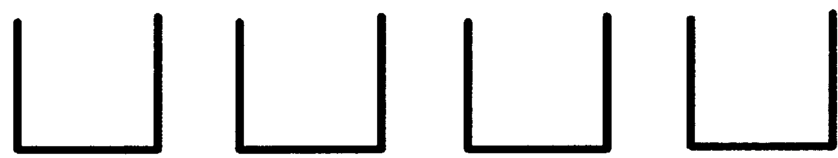
Figure 10B
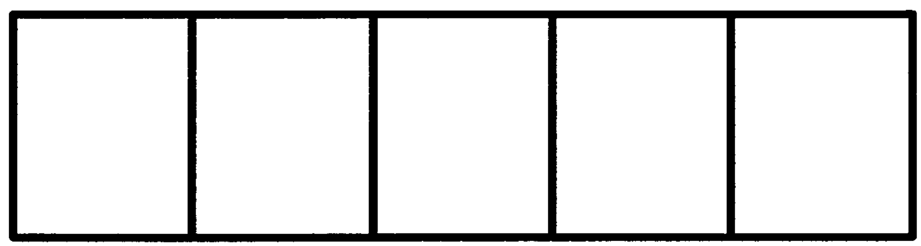
Figure 10C

PEN TIP LANGUAGE AND LANGUAGE PALETTE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to a method and an apparatus for recognizing handwritten information written in various languages. More particularly, the invention relates to a method and apparatus that allows a user to easily enter handwritten information in various languages, while associating the handwritten information with the respective language associated with the information.

BACKGROUND

Typical computer systems, especially computer systems using graphical user interface (GUI) systems, such as Microsoft WINDOWS®, are optimized for accepting user input from one or more discrete input devices for entering text (such as a keyboard), and a pointing device (such as a mouse) with one or more buttons for activating user selections.

Some computing systems have expanded the input systems available to a user by providing a pen-like stylus. Using a pressure sensitive overlay or an electronic digitizer, a computer display may be enhanced to accept interaction from a user by using the stylus. For example, one may write handwritten information on the display.

Handwritten information received into a computer may be used in a variety of ways. For example, the handwritten information may remain as only handwritten information. Also, the handwritten information may be processed by a handwriting recognition engine and the information replaced by text from the handwriting recognition engine. Finally, the handwritten information may remain displayed to a user and the results of the handwriting recognition engine associated with the handwritten information (being displayed in conjunction with the handwriting information or hidden from the user, but still being associated with the handwriting information).

A variety of handwritten information recognizers exist (English, French, German, and the like). After selecting a default language (and associated handwritten information recognizer), a user may write in the default language and have the handwritten information processed by a default recognizer to return text in the default language. While this approach is fine for most uses, a significant portion of the world speaks more than one language. In these situations, users may be writing in a first language yet find some concepts more easily expressed in a second language. A resulting line of handwritten notes may have some words in the first language, some words in the second language, and yet more words in the first language. While the user may easily be able to discern what concepts he was writing at the time, the recognition engine may have a significantly more difficult time. Thus, the user who wishes the freedom to express concepts in a variety of languages is at a disadvantage. A better solution is needed.

SUMMARY

Aspects of the present invention relate to easily modifying which handwriting recognizer is associated with handwritten ink, thereby solving one or more problems described above. In some embodiments, the present invention relates to a stylus with each end having a distinct identification, where each ID is associated with a different recognizer. In other embodiments, the present invention relates to a stylus with a button that, upon activation, cycles through a predefined list of recognizers. In further embodiments, the present invention relates to a user interface for providing easy selection of a recognizer in a given language among others.

These and other features and aspects of the invention will be apparent upon consideration of the following detailed description and the drawings.

DESCRIPTION OF THE DRAWINGS

The foregoing summary of the invention, as well as the following detailed description of the drawings, is better understood when read in conjunction with the accompanying drawings, which are included by way of example, and not by way of limitation with regard to the claimed invention.

FIGS. 4A and 4B illustrate a first embodiment of a language palette and associated pens in accordance with embodiments of the present invention.

FIGS. 5A, 5B, and 5C illustrate a second embodiment of a language palette, a pen, and cyclical language associations in accordance with aspects of the present invention.

FIGS. 10A, 10B, and 10C show examples of a visual indication of a language or recognizer to be associated with handwritten ink in accordance with embodiments of the present invention.

DETAILED DESCRIPTION

Aspects of the present invention relate to providing a system and method for a user to switch among recognizers so handwritten ink may be properly recognized.

The following is arranged into a number of subsections to assist the reader in understanding the various aspects of the invention. The subsections include: terms; exemplary operating environment; pen tip associations; button associations; language assistance; and illustrative processes.

Terms

Ink—A sequence or set of strokes with properties. A sequence of strokes may include strokes in an ordered form. The sequence may be ordered by the time captured or by where the strokes appear on a page. Other orders are possible. A set of strokes may include sequences of strokes or unordered strokes or any combination thereof. Ink may be expanded to include additional properties, methods, and trigger events and the like. When combined with at least some of these events, it may be referred to as an ink object.

Ink object—A data structure storing ink with or without properties, methods, and/or events.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device). The points may be represented using a variety of known techniques including Cartesian coordinates (X, Y), polar coordinates (r, Θ), and other techniques as known in the art.

Exemplary Operating Environment

Figure 1:
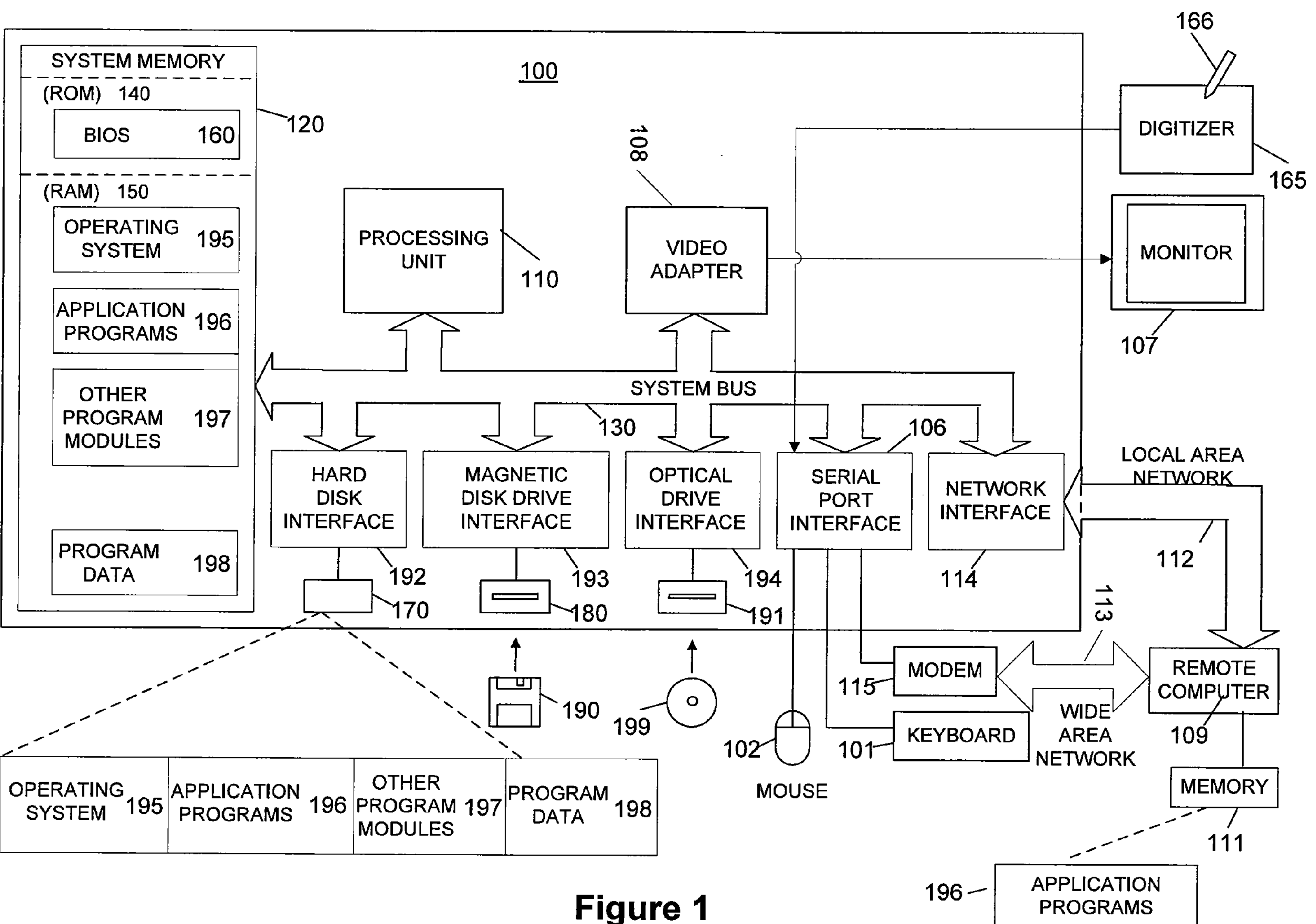
FIG. 1 shows a schematic diagram of a general-purpose digital computing environment that can be used to implement various aspects of the invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. Various connection systems may be used including wired and wireless (including Bluetooth, Wi-Fi and 802.11x, and the like).

Figure 2:
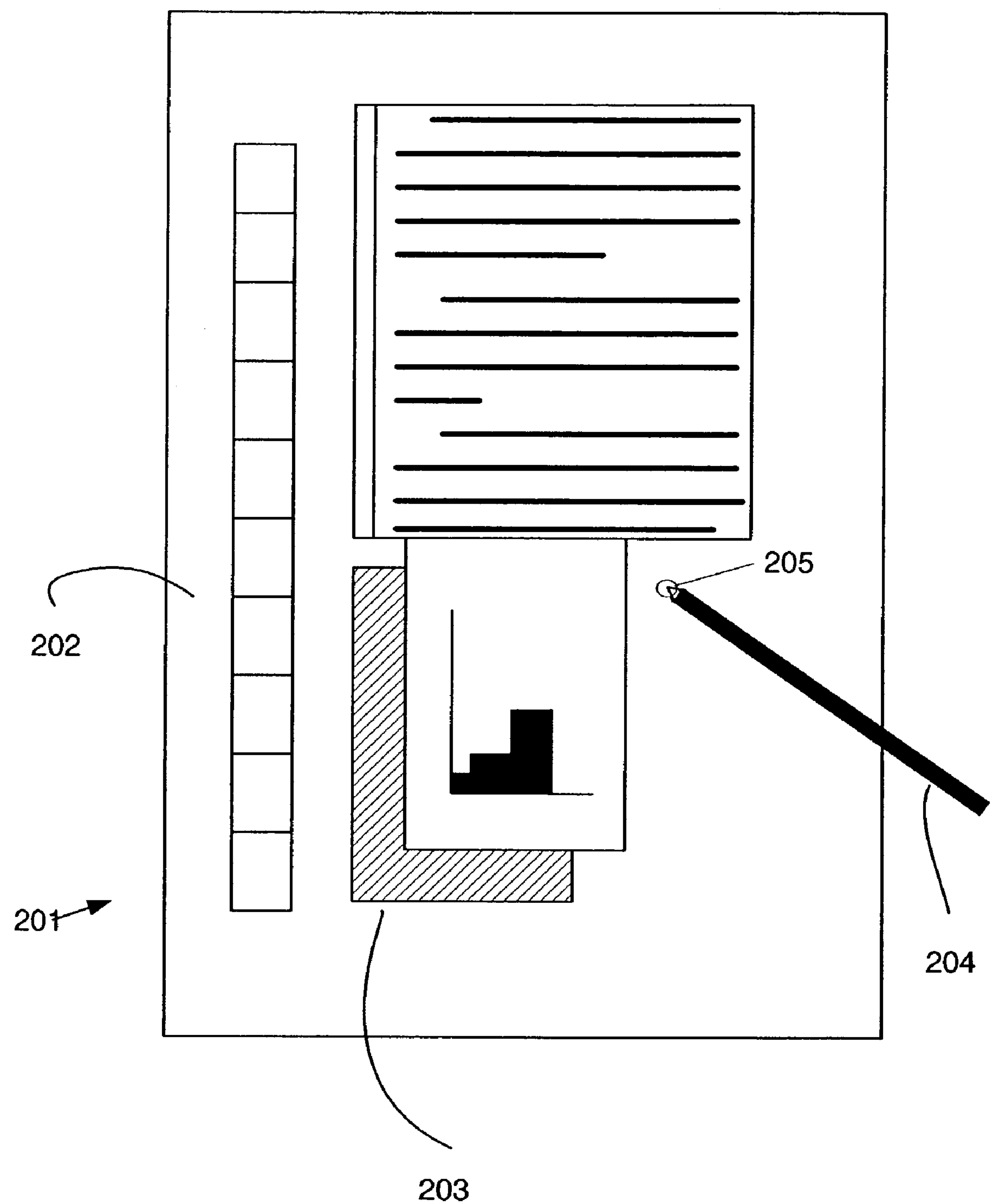
FIG. 2 shows a plan view of a tablet computer and stylus that can be used in accordance with various aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

Pen Tip Associations

Figure 3:
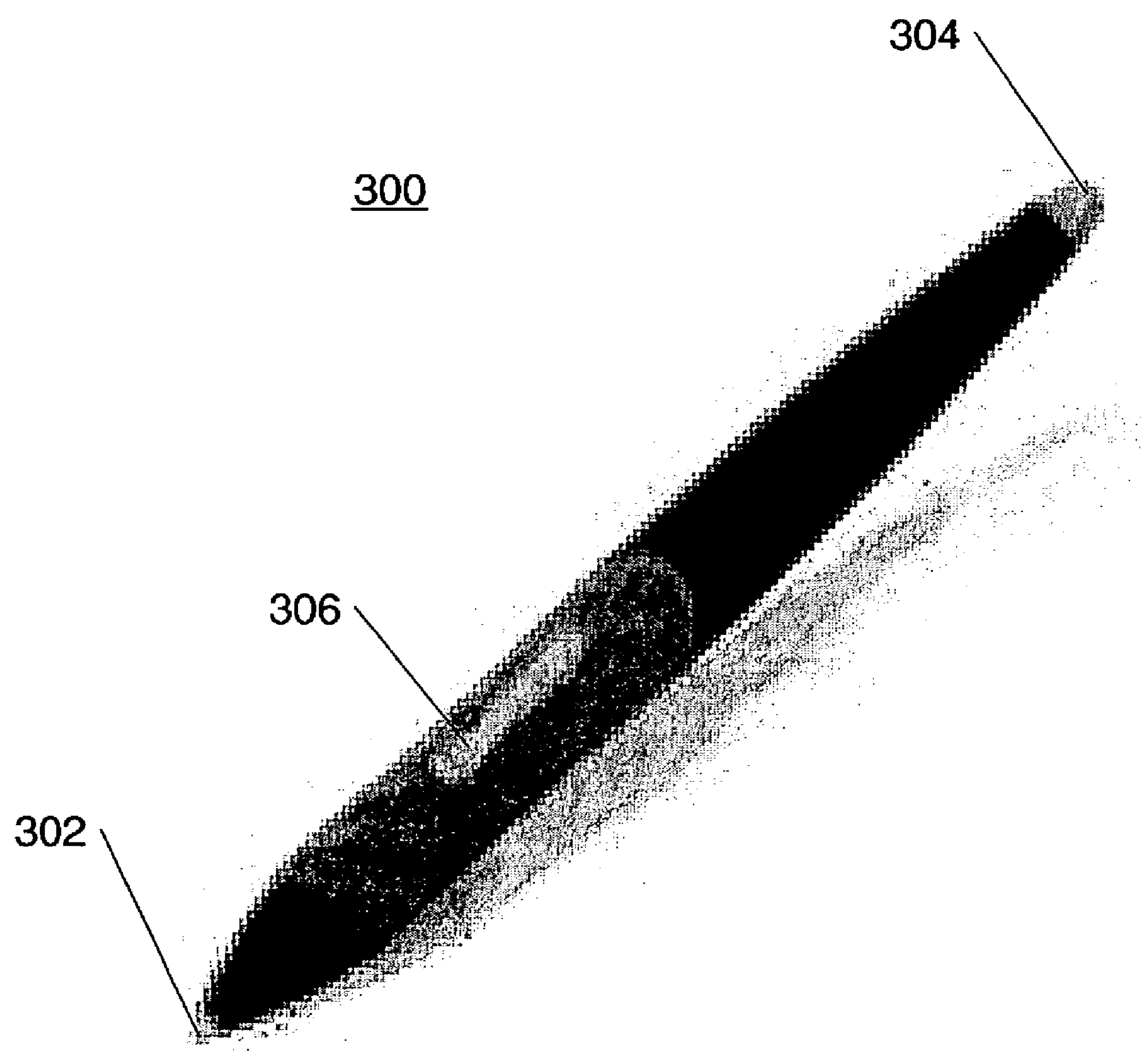
FIG. 3 illustrates a pen that may be used with embodiments of the present invention.

FIG. 3 illustrates an electronic pen 300 as one of a variety of input devices. The pen as shown in FIG. 3 has two pen tips: primary pen tip 302 and secondary pen tip 304. The pen 300 also has a button 306. A pen as shown in FIG. 3 may be available from Wacom Technology Corporation of Vancouver, Wash.

In other examples of the pen 300, it may only have one pen tip 302 and the button 306. In yet other examples, the pen 300 may have two or more pen tips and no buttons. Additional pen tips may include the ends of pen caps and other removable portions. It is appreciated that primary, secondary, and other designations for one pen tip over another is made purely for the purpose of explanation. All pen tips may be considered equal or have a hierarchy.

In a first example of a pen with multiple pen tips, each pen tip may have its own pen tip identification. This identification may become known to the computer system in a variety of ways. For example, the digitizer may be able to determine the pen tip ID. Also, the shape of the footprint created by the pen tip may help identify the pen tip. Other techniques for identifying the pen tip may be used as well.

In the example where the digitizer determines the pen tip ID, the pen tip ID may be determined when the pen tip is near the screen or when it is touching the screen. Where different pen tip IDs are used, the pen tip ID may be mapped to a language.

For example, a user may write in both English and French. The pen the user is using may have two tips, each with its own pen tip ID. The primary tip may be mapped to English and the secondary tip may be mapped to French. Using this arrangement, the user may flip the pen around when she wants to write in French then flip the pen around again when she wants to write in English.

The mapping may include one more associations. For example, the mapping may associate a first handwriting recognizer with ink created with the first pen tip 302 and associate a second handwriting recognizer with ink created with the second pen tip 304. The recognizer may be word based or character based. A character-based recognizer provides the benefit of being simple to implement and requiring a small memory and processor footprint. A word-based recognizer provides the benefit of having higher recognition rates and may permit a natural language model to be applied to the recognized ink to suggest corrections and the like.

In some cases, it may be beneficial to show which language (and associated recognizer) is currently being associated with the created ink. In this case, an indication of the current language (or recognizer) may be displayed in a variety of helpful ways. First, the language associated with the recognizer may be displayed. Alternatively, each language (or recognizer) may be associated with a color or set of colors. Switching pen tips would switch to the color associated with the language or recognizer. Further, the color of the ink may be modified to reflect the language or recognizer associated with it. This way, the user may view a paragraph of ink and see what words, characters, symbols, drawings and the like are associated with which recognizer. Further, instead of color, sound may be used to alert the user to the use of one language or recognizer over the other.

Handwriting recognition capabilities may be used to recognize handwritten ink. The results from the recognition process may be hidden from the user, replace the handwritten ink on the display, or may be displayed in conjunction with the handwritten ink. In some cases, the results of the recognition engine may be stored in an ink object. In other cases, the result may be stored separate from the ink in, for example, a database or table and indexed to the handwritten ink. The recognition engine may run while the handwritten ink is deposited, when handwriting is completed, or some combination of both (for example, if there is a pause of 2 or more seconds).

FIGS. 4A and 4B show a user interface for associating a pen tip with a language and various pens. For purposes herein, the user interface and the mechanism underlying it are referred to as a "language palette." The language palette provides the user with the ability to associate a pen tip ID (FIG. 4A) or state of the pen (FIG. 5A) with a language or handwriting recognizer.

Referring to FIG. 4A, a user can configure a different language for each pen tip ID, such that when the pen tip ID associated with the respective pen tip is sensed, the current input language changes accordingly. Using a language selection palette 400 as shown in FIG. 4A, a user may select pen tip ID 402, pen tip ID 404, or pen tip ID 406 (as represented by tabs for example) and may associate a different language (or the same language) with each of the respective pen tip IDs. FIG. 4A shows one selection mechanism (here, a drop down menu 408) for associating the selected pen tip ID tab (here, 406) with a language from the language selection menu (e.g., drop down menu 408). It is appreciated that a drop down menu as shown as element 408 is for illustrative purposes only. Alternatively, one could use radio buttons, mouse or hover-over menus, and dialog boxes, directory navigation windows, and other selection techniques to associate the pen tip 406 with a language.

Further, one may have predefined languages as tabs (representing recognizers stored in or accessible by the system (e.g., stored remotely over a network)) and having the pen tip IDs in a selection system 408.

FIG. 4B shows various pens with pen tips (410–414). A user may have some or all of the pen tip IDs associated with the pen tips (410–414) mapped to one or more languages. So, one may have an English-Spanish pen, an English-French pen, and an English-Math pen. A math (or equation) pen may be used as well. For example, if one was using a math recognizer, a "Σ" may be recognized as a summation symbol and not a capital "E" and an "a" may be recognized as an "α."

Further, some pen tip IDs may not be associated with a language or recognizer. This may be a default setting or a non-recognition setting. So, for example, if one were attempting to draw a picture, the system would not attempt to associate the ink (ink object or strokes of the picture) with a recognizer (which may eventually attempt to recognize the ink, producing erroneous results).

The above ability to associate a pen tip ID with a non-traditional language property (math, graphical shapes, and the like), may be realized in a variety of ways. First, for example, a single non-language pen tip ID may be assigned and the interpretation of the pen tip ID is left to the software context (such as currency field of Excel or a music sheet of some sort of music composing assistance software, for instance). The interpretation of the pen tip may depend on the context. For example, if the pen tip ID is associated with a language, ink is recognized as text, otherwise, ink may be associated with an alternative identity (for example, musical notes in the music composing-assistance software or a geographical graphics element in a graphic or drawing software, or the like).

Second, an alternative approach is to enumerate all non-language properties (such as graphical shapes, currency number, musical notes) and then treat them equally in reference to the language property.

Further, in some embodiments, a recognizer may recognize a shape and map that shape based on the current language associated with an input device, such as the currently used pen tip. For example, a rectangular shape drawn while the language setting for the input device is U.S. English may result in the "the stars and stripes" flag being displayed, while the same rectangle drawn when the language setting for the input device is UK English may result in the Union Jack being displayed.

In other embodiments, a particular recognizer to be used is selected based on the language setting of the input device and a software context of the input. For example, when a number is written into a currency field of a spreadsheet when the language setting for the input device is U.S. English, the recognizer not only recognizes the ink as a number, but also may enter an appropriate currency sign, such as $, a thousand separator, and a decimal point. Using other examples, the input device or pen tip may have no language associated with it when being used in another software context, for example, with music composing aid software or a graphics software. Such input may be recognized as musical notes or graphics elements, respectively; however, if a language is associated with the input device, in this situation, the input may be recognized as text.

In some embodiments, the language setting of the input device may affect items already displayed. For example, when a software keyboard is displayed and an input device, such as a pen having a pen tip configured with an ID indicating French is within a predetermined distance of the display, the pen tip ID of the pen is detected and a French software keyboard may be displayed. When the pen, at a later time, is within a predetermined distance of the display, and the pen tip ID of the pen is detected to map to U.S. English, the displayed software keyboard may be changed to a U.S. English software keyboard. In this example, the language setting of the input device is not associated with ink. Rather, it is associated with changing the language associated with another information pathway.

Button Associations

Aspects of the present invention may be applied to both pen-based and non-pen based computing systems. For example, aspects of the present invention relate to associating a language or recognizer with a button click. As shown in FIGS. 3 and 5B, some pens may have one or more buttons (306, 516, and 517). Mice and trackballs have buttons as well. Aspects of the present invention permit one to map a button click to a language or recognizer. If one was writing with a pen and needed to change languages, he may click an action button on the pen and have the pen tip ID associated with the next recognizer. This may also be applied to mice and trackballs in that, when one is using the mouse as a handwriting input mechanism, clicking a mouse button may provide the same cycling through the languages or recognizers.

Some input devices, such as, for example, a computer mouse, a stylus, or an electronic pen having only one pen tip may also be used with embodiments of the invention. A predetermined list of languages may be configured by using a language palette such as a language palette 500, shown in FIG. 5A. In this embodiment, to configure a list of input languages, a user may select one of tabs 502, 504 or 506 and choose an input language from menu 508. While entering electronic ink input, a user may indicate a change of input language by various means. For example, if a computer mouse is used, depressing a button may be used to cause the next language to be selected. For example, a switch from a first language to a second language will occur. If a stylus is used, a button on the stylus may be used. Further, if no button on the stylus or pen, one may tap on a displayed button on the user interface that indicates the current or next language selection.

Illustrative language palette 500 shows that three clicks may be configured; however, other embodiments are possible in which fewer or more clicks may be configured. In a related embodiment, for use with a pen that has a single tip with one unchangeable pen tip ID or for use with an input device that includes, for example, a stylus or a pointing device with no electronic ID, the user may change the input language by using a language palette similar to that of FIG. 4A, but one that allows only one language to be configured. Thus, tabs 504 and 506 would not be displayed. In this embodiment, the user may change the input language by selecting the language palette and selecting another desired language by means of the pop-up menu. This approach of having a language palette readily available for a user provides the benefit of an easy user interface to navigate, as opposed to drilling down through a number of menu options to change the language associated with an input device.

Accordingly, using the pen of FIG. 5B, a user may have a number of languages associated with the pen. For example, the user may have a first language set dedicated to the first pen tip 512 with its associated pen tip ID and a second language set dedicated to the second pen tip 514 with its associated pen tip ID. If only one button 516 is used, the clicking of the button may cycle through the language sets for that pen tip ID. If two or more buttons are used (buttons 516 and 517, for example), the clicking of the different buttons may cycle through different sets of languages or recognizers. Further, both buttons may operated at the same time to click through even more languages or recognizers, or may be used to reset all click states back to a default or initial click state.

FIG. 5C shows a table listing clicks of one or more buttons with a language associated with a pen tip ID. The table includes clicks 518 and pen tip IDs 520, 522, and 524. If using a first pen tip with its first pen tip ID, the clicking may cycle through a first set of languages (for example, English, French, and German). If using a second pen tip with a second pen tip ID, the clicking may cycle through the same set of languages with the same or offset starting language. Alternatively, a different language set may be associated with the second pen tip ID. For example, clicking while using the second pen tip may cycle through Japanese, English, and Italian.

Instead of the clicking of a button, as described above, to change a language association with an input device, other techniques may be used. For example, a temporary language association change may be performed when a gesture is made with an electronic pen, such as making a circular motion with the pen while hovering above the display, or slanting the pen by an angle more than a predetermined number of degrees from the upright position. Of course, many other techniques may be used and the invention is not limited to only those techniques listed above.

Language Assistance

Figure 6:
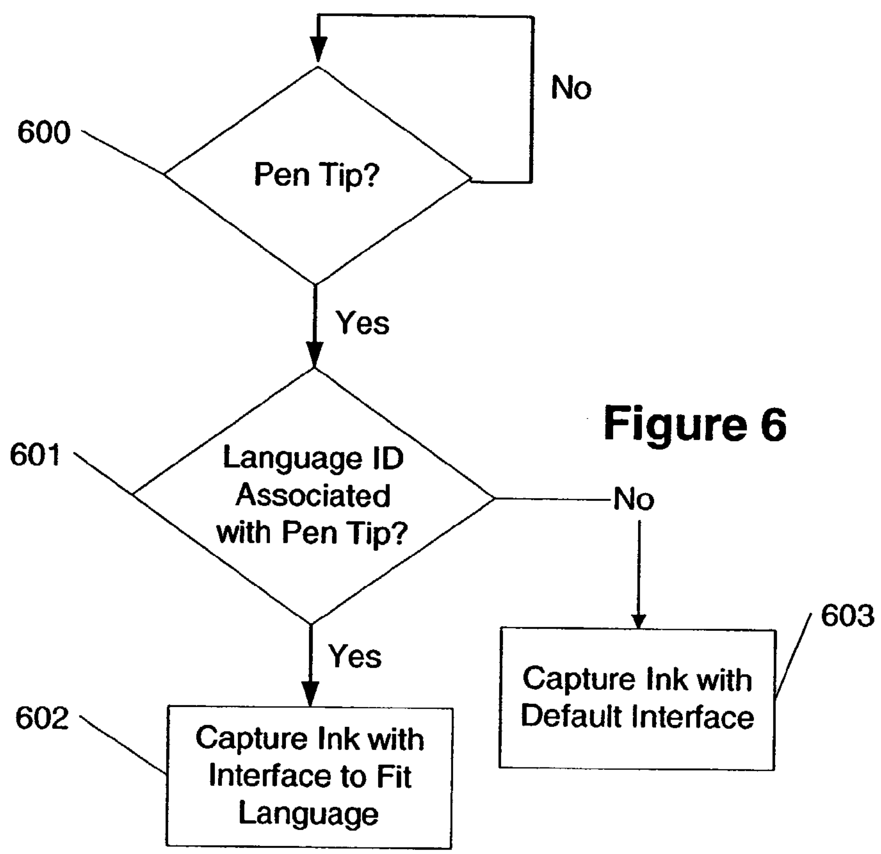
FIG. 6 represents a process of adjusting a user interface to comport with a language in accordance embodiments of the invention.

In some situations, it may be difficult for a user to remember what language was assigned to a pen tip or to a current click state of the pen (or mouse or trackball). As an option, the system may provide to a user a visual or audible indication of a current language or change in language. For example, FIG. 6 shows a process for modifying a user interface to reflect a language or recognizer being associated with received ink. In step 600, the system checks to see if a pen tip is at least near the display screen (near or touching). If there is a pen tip near or touching the display screen, then the system steps to step 601. Otherwise, the system checks later or waits until an event is received that indicates a pen tip is near or touching the display screen. Next, in step 601, the system determines if a language identification (language ID) is associated with the pen tip. The pen tip may include a pen tip ID or may not. If yes, then the user interface may be modified in step 602 to accommodate the language associated with the pen tip from step 601. This step 602 reflects to a user that the ink being captured will be associated with a language or recognizer. Otherwise, in step 603, the user will be shown a default interface and the ink will be associated with a default language. The checking of step 600 may be event driven. That is, an event may be generated each time the pen tip is near or touching the display screen. Alternatively, the checking of step 600 may be performed every predetermined time period, i.e. in a polling manner.

Illustrative Processes

Figure 7:
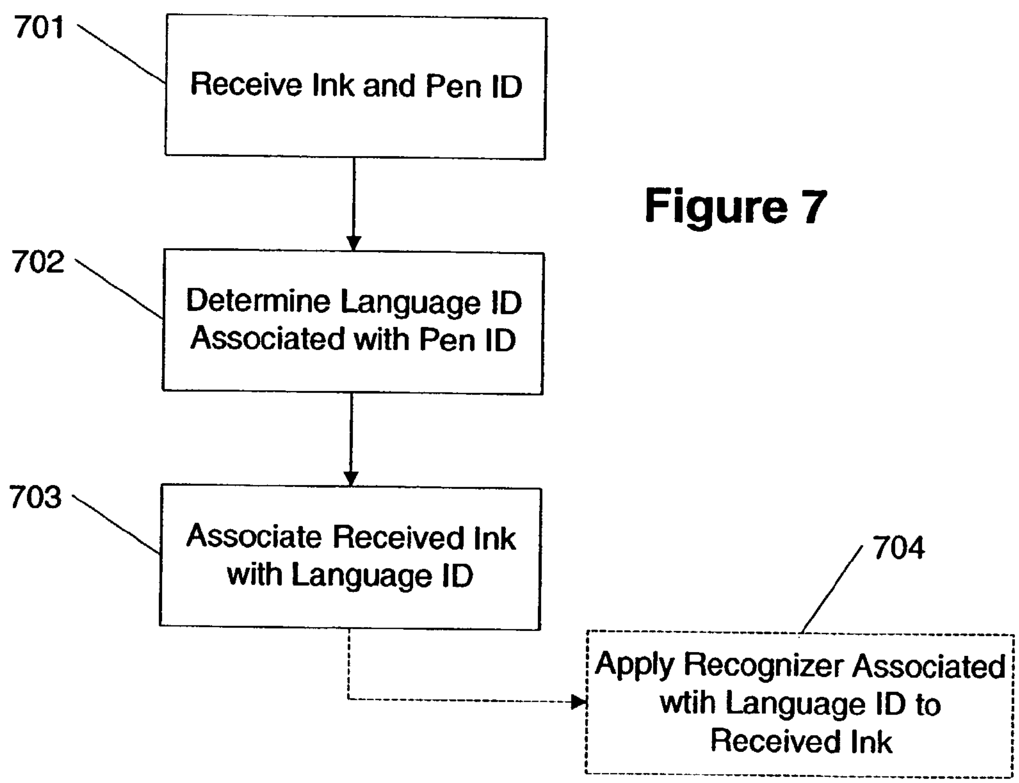
FIG. 7 shows a process for associating a language or a recognizer with received handwritten ink in accordance with embodiments of the invention.

FIG. 7 shows a more detailed process for associating received ink with a language. In step 701, ink is received along with a pen tip ID. In step 702, the system determines the language ID associated with a pen tip ID. In step 703, the received ink is associated with the language ID from step 702. This may be the end of the association process of FIG. 7. Alternatively, as shown in broken lines, a recognizer associated with the language ID may process the received ink as shown in step 704.

Figure 8:
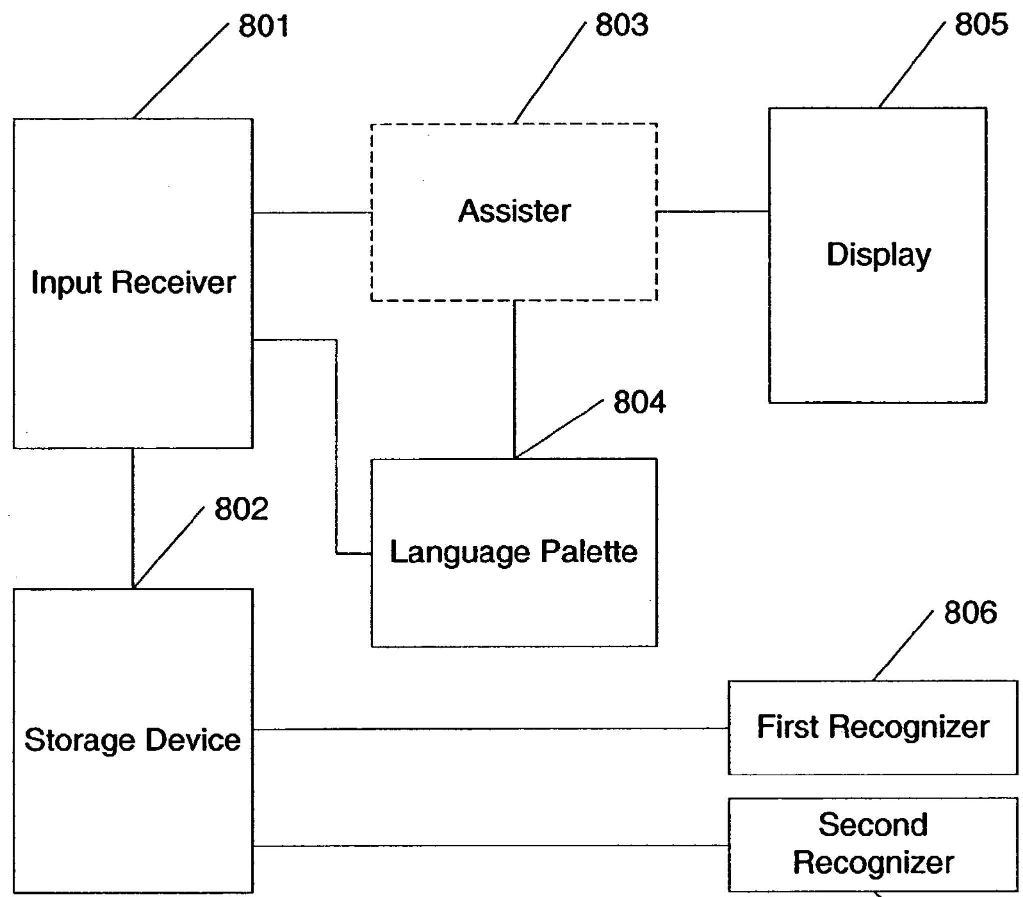
FIG. 8 represents a sample set of relationships between components in accordance with embodiments of the invention.

FIG. 8 shows, in block diagram form, an illustrative apparatus for implementing aspects of the invention. The apparatus includes an input receiver 801, which may be, for example, a digitizer, such as digitizer 165 for receiving strokes of electronic ink. With regard to this specification, language not only refers to written languages, including but not limited to, for example, English and Japanese, but may also refer to special symbols, such as mathematical symbols used to express mathematical formulas.

Language palette 804 maps the input strokes to a particular language (language ID) or recognizer. That is, strokes input from a pen having a pen tip ID that is mapped to a particular language ID are mapped to the language ID by language palette 804. The input strokes and the language indicator (or identification of the recognizer) may be stored in storage device 802, which may include, but not be limited to computer memory, such as Random Access Memory (RAM), optical disk, floppy disk, and hard disk.

Language palette 804 provides an indication to assister 803 to inform assister 803 of the current input language. Assister 803 (optional aspect as shown in broken lines) may cause a visual indication to appear on the display 805 so as to provide an indication of the current input language. Further, assister 803 may alternatively (or additionally) cause an audio indication to be heard, which provides an indication of the current input language.

Language palette 804, recognizers 806 and 807 and optional assister 803 may be implemented as program modules residing in RAM 150 and executed by processing unit 110. Further, the storage device 802 may include, but not be limited to RAM 150, hard disk 170 or magnetic disk 190.

The visual indication, which may be provided by assister 803, may be presented in a number of ways, including, but not limited to displaying a textual message, such as a name of the current input language, displaying electronic ink in a particular color (with the color providing an indication of the current input language—e.g., red for English and blue for Japanese), indicating the current input language by the background color, and indicating the current input language by a thickness of entered strokes of the electronic ink (for instance, thick strokes indicating English and thin strokes indicating Japanese). FIGS. 10A, 10B, and 10C provide additional examples of a visual indication of the language to be associated with received ink. For instance, a straight horizontal line may indicate that the language to be associated with received ink is a character-based language (e.g., English), while a three-quarter box from FIG. 10B or a boxed input region FIG. 10C may indicate that the language to be associated with the ink is a symbolic language (e.g., Japanese). Display 805 may be used to display the visual indication and may be used to display the strokes electronic ink as they are entered.

The audio indication, which may be provided by assister 803, may be presented as, for example, particular tones, such as a high tone for English and a low tone for Japanese. Further, a tune may be played as an indication. For example, the national anthem of a particular country may be played, such as the national anthem of the United States to indicate English and the national anthem of Japan to indicate Japanese. The audio indication may be played through a speaker, as is well-known in the art.

Storage device 802 stores input strokes of electronic ink along with a language or recognizer identification.

The system may have a plurality of handwriting recognizers, for example, one for each language. In the system shown in FIG. 8, a first recognizer 806 and a second recognizer 807 are illustrated, although the system may have more than two recognizers.

Figure 9:
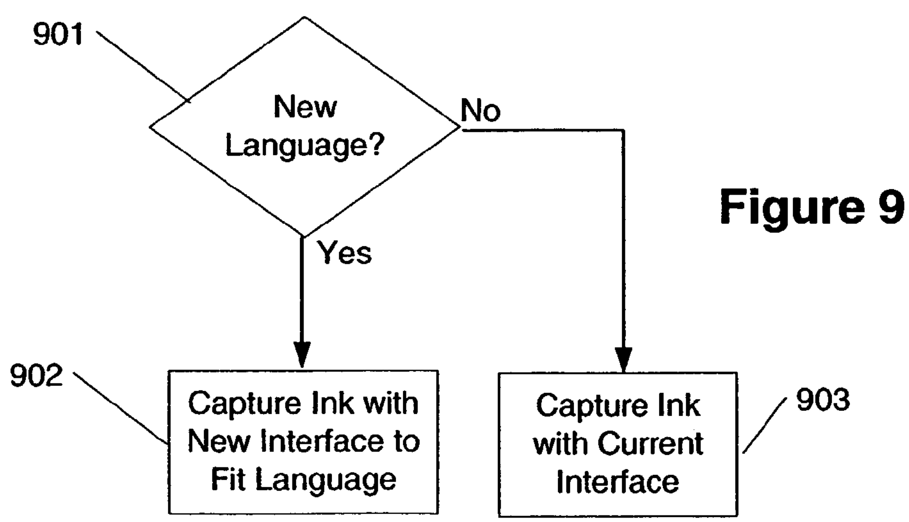
FIG. 9 shows a process of modifying a user interface when a new language is used in accordance with embodiments of the invention.

FIG. 9 illustrates an optional process that may be used when modifying the language or recognizer associated with the pen (with or without a pen tip ID) or other input device. At 901, a check is performed to determine whether a new language has been selected. As mentioned earlier, if the input device is a stylus, the user may move a pen with identification of the pen tip or, alternatively, may press or select a next language box to select a next language from a predefined list of languages. Further, the user may configure input for another language by using the language palettes described in relation to FIGS. 4A and 5A. For example, if the input device is a computer mouse, a button of the mouse may be depressed to cause the next language from the predefined list of languages to be selected. If a new language was selected, the strokes of electronic ink may be captured at step 902 with a new interface to fit the new language or recognizer. Otherwise, at step 903, the strokes of electronic ink are captured with the current interface.

Aspects of the present invention have been described in terms of various illustrative embodiments. Numerous other embodiments, modifications and variations within the scope and spirit of the appended claims will occur to persons of ordinary skill in the art from a review of this disclosure.

I claim:

1. A method of associating a language with a pen tip ID, the method comprising:
- determining movement of a pen having a pen tip ID to at least near a display;
- receiving transmission of the pen tip ID from the pen to a processing device when the pen is less than a predetermined distance from the display; and
- ensuring that a current language setting is set according to a language associated with the pen tip ID.

2. The method of claim 1, further comprising configuring a recognizer associated with the current language setting for recognizing input from the pen.

3. The method of claim 1, further comprising displaying an object on the display, wherein an aspect of the displayed object is displayed in accordance with the language associated with the pen tip ID.

4. The method of claim 3, wherein the displayed object is a software keyboard and the aspect of the displayed object is a language of a plurality of characters, each of the characters being associated with one of a plurality of keys of the software keyboard.

5. The method of claim 3, wherein the aspect of the displayed object is further in accordance with a software context in which the object was input by the pen.

6. The method of claim 1, further comprising ensuring that the current language setting continues to be set according to the pen tip ID when the pen is less than the predetermined distance from the display.

7. The method of claim 6, wherein the ensuring is performed in an event-driven manner.

8. The method of claim 6, wherein the ensuring is performed in a polling manner.

9. The method of claim 1, further comprising changing the current language setting when the pen is less than the predetermined distance from the display and the pen tip ID is associated with a language that is different from that of the current language setting.

10. A method of using an input device to enter electronic ink into a processing device, such that the ink may be associated with more than one language, the method comprising:
- using the input device to enter the ink into the processing device; and
- storing, in the processing device, a language indication associated with the ink,
- wherein the input device is an electronic pen and the language indication is an electronic ID transmitted from the electronic pen to the processing device.

11. The method of claim 10, further comprising:
- providing a second indication to the processing device;
- using the input device to enter additional ink into the processing device; and
- storing, in the processing device, a second language indication associated with the additional ink, the second language indication corresponding to the second indication provided in the providing step.

12. The method of claim 11, further comprising:
- using a recognizer associated with the language indication to recognize the ink; and
- using a recognizer associated with the second language indication to recognize the additional ink.

13. The method of claim 11, further comprising selecting the indication to be sent by the input device by using a switch associated with the input device.

14. The method of claim 10, further comprising using a recognizer associated with the language indication to recognize the ink.

15. The method of claim 14, further comprising providing assistance to a user, a type of the assistance being based on a current language for which the processing device is configured.

16. The method of claim 10, further comprising providing an indication to a user indicating which one of the languages is set as a current language.

17. The method of claim 16, wherein the indication is a visual indication.

18. The method of claim 17, wherein the visual indication is indicated by a color of the electronic ink.

19. The method of claim 17, wherein the visual indication is indicated by a background color.

20. The method of claim 17, wherein the visual indication is indicated by a displayed thickness of entered strokes of the electronic ink.

21. The method of claim 16, wherein the indication is an audio indication.

22. The method of claim 10, further comprising changing a language associated with the input device by making a gesture with the input device.

23. The method of claim 10, wherein the electronic pen has a plurality of tips and each of the tips has a corresponding electronic ID associated with a respective language.

24. The method of claim 10, wherein the electronic pen transmits the electronic ID to the processing device when the pen is within a predetermined distance of the processing device.

25. The method of claim 10, wherein the input device is a pointing device for inputting the electronic ink, wherein the pointing device includes a switch, such that operation of the switch causes an indication to be sent to the processing device to cause future strokes of electronic ink input from the pointing device to be associated with another language.

26. The method of claim 10, further comprising using a user interface to change a mapping of the input device to another language.

27. A machine-readable medium having recorded thereon information for a processor, such that when the information is loaded into the processor, the processor is configured to perform:

determining movement of a pen having a pen tip ID to at least near a display;

receiving transmission of the pen tip ID from the pen when the pen is less than a predetermined distance from the display; and ensuring that a current language setting is set according to a language associated with the pen tip ID.

28. The machine-readable medium of claim 27, wherein the processor is further configured to perform configuring a recognizer associated with the current language setting for recognizing input from the pen.

29. The machine-readable medium of claim 27, wherein the processor is further configured to perform displaying an object on the display, wherein an aspect of the displayed object is displayed in accordance with the language associated with the pen tip ID.

30. The machine-readable medium of claim 29, wherein the displayed object is a software keyboard and the aspect of the displayed object is a language of a plurality of characters, each of the characters being associated with one of a plurality of keys of the software keyboard.

31. The machine-readable medium of claim 29, wherein the aspect of the displayed object is further in accordance with a software context in which the object was input by the pen.

32. The machine-readable medium of claim 27, wherein the processor is further configured to perform ensuring that the current language setting continues to be set according to the pen tip ID when the pen is less than the predetermined distance from the display.

33. The machine-readable medium of claim 32, wherein the ensuring is performed in an event-driven manner.

34. The machine-readable medium of claim 32, wherein the ensuring is performed in a polling manner.

35. The machine-readable medium of claim 27, wherein the processor is further configured to perform changing the current language setting when the pen is less than the predetermined distance from the display and the pen tip ID is associated with a language that is different from that of the current language setting.

36. A machine-readable medium having recorded thereon information for a processor, such that when the information is loaded into the processor, the processor is configured to permit:

using an input device to enter ink into a processing device; and storing, in the processing device, a language indication associated with the ink, wherein the input device is an electronic pen and the language indication is an electronic ID transmitted from the electronic pen to the processing device.

37. The machine-readable medium of claim 36, wherein the processor is further configured to permit:

providing a second indication to the processing device;

using the input device to enter additional ink into the processing device; and storing, in the processing device, a second language indication associated with the additional ink, the second language indication corresponding to the second indication provided in the providing step.

38. The machine-readable medium of claim 37, wherein the processor is further configured to permit:

using a recognizer associated with the language indication to recognize the ink; and using a recognizer associated with the second language indication to recognize the additional ink.

39. The machine-readable medium of claim 37, wherein the processor is further configured to receive a selected indication from the input device by using a switch associated with the input device, the selected indication being associated with a given language.

40. The machine-readable medium of claim 36, wherein the electronic pen has a plurality of tips and each of the tips has a corresponding electronic ID associated with a respective language.

41. The machine-readable medium of claim 36, wherein the electronic pen transmits the electronic ID to the processing device when the pen is within a predetermined distance of the processing device.

42. The machine-readable medium of claim 36, wherein the processor is further configured to permit using a recognizer associated with the language indication to recognize the ink.

43. The machine-readable medium of claim 42, wherein the processor is further configured to provide assistance to a user, a type of the assistance being based on a current language for which the processing device is configured.

44. The machine-readable medium of claim 36, wherein the processor is further configured to provide an indication to a user indicating which one of the languages is set as a current language.

45. The machine-readable medium of claim 44, wherein the indication is a visual indication.

46. The machine-readable medium of claim 45, wherein the visual indication is indicated by a color of the electronic ink.

47. The machine-readable medium of claim 45, wherein the visual indication is indicated by a background color.

48. The machine-readable medium of claim 45, wherein the visual indication is indicated by a displayed thickness of entered strokes of the electronic ink.

49. The machine-readable medium of claim 44, wherein the indication is an audio indication.

50. The machine-readable medium of claim 36, wherein the processor is further configured to change a language associated with the input device when a gesture is made with the input device.

51. The machine-readable medium of claim 36, wherein the input device is a pointing device for inputting the electronic ink, wherein the pointing device includes a switch, such that operation of the switch causes an indication to be sent to the processing device, which is further configured to recognize the indication and cause future electronic ink input from the pointing device to be associated with another language.

52. The machine-readable medium of claim 36, wherein the processor is further configured to provide a user interface to change a mapping of an indication from the input device to another language, such that when the indication is next received by the processing device, the indication is associated with a different language.

53. An apparatus for receiving electronic ink, the apparatus comprising:

a display; and a processing device associated with the display, wherein when a pen having a pen tip ID is moved to less than a predetermined distance from the display, the processing device is configured to:

receive a transmission of the pen tip ID from the pen; and ensure that a current language setting is set according to a language associated with the pen tip ID.

54. The apparatus of claim 53, further comprising a recognizer, wherein the recognizer is associated with the current language setting for recognizing input from the pen.

55. The apparatus of claim 53, wherein the processing device is configured such that when an object is displayed on the display, an aspect of the displayed object is displayed in accordance with a language associated with the pen tip ID.

56. The apparatus of claim 55, wherein the displayed object is a software keyboard and the aspect of the displayed object is a language of a plurality of characters, each of the characters being associated with one of a plurality of keys of the software keyboard.

57. The apparatus of claim 55, wherein the aspect of the displayed object is further in accordance with a software context in which the object is input by the pen.

58. The apparatus of claim 53, wherein the processing device is configured to ensure that the current language setting continues to be set according to the pen tip ID when the pen is less than the predetermined distance from the display.

59. The apparatus of claim 58, wherein the apparatus is configured to ensure that the current language setting continues to be set according to the pen tip ID in an event-driven manner.

60. The apparatus of claim 58, wherein the apparatus is configured to ensure that the current language setting continues to be set according to the pen tip ID in a polling manner.

61. The apparatus of claim 53, wherein the processing device is configured to change the current language setting when the pen is less than the predetermined distance from the display and the pen tip ID is associated with a language that is different from that of the current language setting.

62. An apparatus for receiving electronic ink, the apparatus comprising:

an input receiver for receiving input, the input including the electronic ink;

a storage device for storing a language indication associated with the ink;

a language palette; and an electronic pen as an input device, wherein the electronic pen has a tip and the tip has a corresponding electronic ID associated with a respective language, wherein the electronic pen is configured to send the corresponding electronic ID to the input receiver when the tip of the electronic pen is within a predetermined distance of the input receiver, and the input receiver is configured to pass the electronic ID to the language palette, which is configured to change the configured input language to a language corresponding to the electronic ID as indicated by the language palette.

63. The apparatus of claim 62, further including a processing device, wherein the processing device is configured to receive a second indication, and the storage device is further for storing a second language indication associated with additional ink, the second language indication corresponding to the received second indication.

64. The apparatus of claim 63, further comprising:

a first recognizer for recognizing the stored ink; and a second recognizer for recognizing the stored additional ink.

65. The apparatus of claim 64, further comprising an assister for providing assistance to a user, wherein a type of assistance provided is based on a current language setting for receiving electronic ink.

66. The apparatus of claim 62, further comprising a recognizer associated with a language to recognize the ink, the language corresponding to the language indication.

67. The apparatus of claim 66, further comprising an assister for providing a user an indication of a current language setting for new input strokes of electronic ink.

68. The apparatus of claim 67, further comprising a display, wherein the assister provides the indication visually via the display.

69. The apparatus of claim 68, wherein the indication is provided by means of a color of the electronic ink displayed on the display.

70. The apparatus of claim 68, wherein the indication is provided by means of a background color displayed on the display.

71. The apparatus of claim 68, wherein the indication is provided by means of a displayed thickness of entered strokes of the electronic ink.

72. The apparatus of claim 67, wherein the indication is an audio indication.

73. The apparatus of claim 62, wherein the input device has a switch, wherein operation of the switch causes a change of a configured input language.

74. The apparatus of claim 62, wherein the electronic pen has a plurality of tips, each of the respective tips having a corresponding electronic ID associated with a respective language.

75. The apparatus of claim 62, wherein the electronic pen includes a switch, such that operation of the switch causes an indication to be sent to the input receiver to cause future strokes of electronic ink input from the electronic pen to be associated with another language.

76. The apparatus of claim 62, wherein the language palette is a configurable language palette for mapping a language indication of a plurality of language indications to a language, the language palette being configurable to map the language indication to one of a plurality of languages via a user interface.

* * * * *

UNITED STATES PATENT AND TRADEMARK OFFICE
CERTIFICATE OF CORRECTION

PATENT NO. : 7,206,737 B2
APPLICATION NO. : 10/336003
DATED : April 17, 2007
INVENTOR(S) : Tetsuo Seto It is certified that error appears in the above-identified patent and that said Letters Patent is hereby corrected as shown below:

On the Title Page, Item (73), under "Assignee", line 1, delete "Mircosoft" and insert -- Microsoft --, therefor.

Signed and Sealed this

Twentieth Day of July, 2010

David J. Kappos

*Director of the United States Patent and Trademark Office*